United States Patent
Tsukagoshi

(10) Patent No.: US 9,007,699 B2
(45) Date of Patent: Apr. 14, 2015

(54) LENS POSITION ADJUSTMENT APPARATUS, PROJECTOR, LENS POSITION ADJUSTMENT METHOD, AND LENS POSITION REGISTRATION METHOD

(71) Applicant: Seiko Epson Corporation, Tokyo (JP)

(72) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 99 days.

(21) Appl. No.: 13/959,128

(22) Filed: Aug. 5, 2013

(65) Prior Publication Data

US 2014/0055874 A1    Feb. 27, 2014

(30) Foreign Application Priority Data

Aug. 23, 2012  (JP) ................. 2012-183812

(51) Int. Cl.
| | | |
|---|---|---|
| G02B 15/14 | (2006.01) | |
| G02B 7/02 | (2006.01) | |
| G02B 7/04 | (2006.01) | |
| G02B 7/08 | (2006.01) | |

(52) U.S. Cl.
CPC ... *G02B 7/04* (2013.01); *G02B 7/08* (2013.01)

(58) Field of Classification Search
USPC ................. 359/694–696, 811, 813, 815, 819, 359/822–824
See application file for complete search history.

(56) References Cited

U.S. PATENT DOCUMENTS

| | | | |
|---|---|---|---|
| 5,543,971 | A | 8/1996 | Nomura et al. |
| 2011/0069946 | A1 | 3/2011 | Honjo et al. |

FOREIGN PATENT DOCUMENTS

| | | |
|---|---|---|
| JP | A-5-60968 | 3/1993 |
| JP | A-7-218806 | 8/1995 |
| JP | A-10-160999 | 6/1998 |
| JP | A-2009-42621 | 2/2009 |
| JP | A-2010-57212 | 3/2010 |
| JP | A-2011-85928 | 4/2011 |

*Primary Examiner* — Joseph P Martinez
*Assistant Examiner* — Brandi Thomas
(74) *Attorney, Agent, or Firm* — Oliff PLC

(57) ABSTRACT

A lens position adjustment apparatus includes: a transmission unit that is displaced in a first direction oriented from one end point toward the other end point or a second direction oriented from the other endpoint toward the one endpoint to transmit power of a drive source; a conversion unit that moves a lens by using the power supplied from the transmission unit; a drive control unit that controls the drive source; a position detection unit that detects a current position of the transmission unit; and a storage unit that stores a registered position and a registered direction, wherein the drive control unit controls the drive source in such a way that a final displacement direction is the second direction in case that the registered position is within a predetermined amount of displacement from the one end point, and that the final displacement direction is the registered direction otherwise.

12 Claims, 11 Drawing Sheets

| NO. | ENCODER VALUE | FINAL DISPLACEMENT DIRECTION |
|---|---|---|
| 1 | 512 | FIRST DIRECTION |
| 2 | 498 | SECOND DIRECTION |
| 3 | 1008 | FIRST DIRECTION |

LENS POSITION ADJUSTMENT APPARATUS, PROJECTOR, LENS POSITION ADJUSTMENT METHOD, AND LENS POSITION REGISTRATION METHOD

CROSS-REFERENCE

The entire disclosure of Japanese Patent Application No. 2012-183812 filed on Aug. 23, 2012, which is hereby incorporated by reference in its entirety.

BACKGROUND

1. Technical Field

The present invention relates to adjustment of the position of a lens used, for example, in a projector.

2. Related Art

In a projector, to adjust the position of a lens, such as a zoom lens and a focus lens, a transmission mechanism is used to transmit the power of a motor to a conversion mechanism formed, for example, of a rack and a pinion. The transmission mechanism is formed, for example, of gears, and the position of the lens can be detected with an encoder that detects the amount of rotation of any of the gears. In general, since such a transmission mechanism has what is called a backlash that is, for example, a gap between engaging portions of gears or engaging portions of a gear and a thread, the lens position detected with the encoder may deviate from the actual lens position. In view of the fact described above, a method for accurately adjusting the lens position by canceling such a backlash has been proposed. JP-A-2009-42621 discloses a method for moving a lens to a position registered in advance (hereinafter referred to as "registered position") by first moving the lens in a predetermined direction, stopping the lens in a position beyond the registered position, and then rotating a motor backward to return the lens to the registered position. In the method, a backlash is eliminated by rotating the motor backward.

The amount of backlash changes due to environmental conditions (such as temperature and humidity) and elapsed time. In consideration of the fact described above, a method for returning a lens to an accurate registered position even when the amount of backlash changes has been proposed as follows: The method includes registering a final movement direction of the lens used when the position thereof is registered (hereinafter also referred to as "registration direction") along with information on the registered position, moving the lens in the same direction as the registration direction when operation of moving the lens to the registered position (hereinafter referred to as "return operation") is carried out, and placing the lens in the registered position. When the method is used in a state in which the registered position is close to an end point of the movable range of the lens, however, a user may feel something is wrong with user's fine adjustment of the lens position made after the lens is returned to the registered position.

Specifically, assume that the position registration is made by moving the lens in a direction toward one end point of the movable range of the lens (hereinafter referred to as "direction A") and then moving the lens for the position registration in the opposite direction (hereinafter referred to as "direction B") after the lens reaches the end point. To return the lens to the registered position, the same operation is performed and the lens is eventually moved in the direction B and reaches the registered position. When the registered position is close to the end point of the movable range, the user is likely to make a fine adjustment of the current lens position toward the end point after the lens reaches the registered position. When the fine adjustment of lens position is made this way, the movement direction of the lens (direction A) is opposite to the direction B, which is the final movement direction used to return the lens. In this case, the backlash present in the transmission mechanism is first eliminated, and then the lens starts moving toward the endpoint after the backlash is eliminated. As a result, there is a delay between the time when the user starts the fine adjustment of the lens position and the time when the lens position is actually changed, and the delay may disadvantageously cause the user to feel something is wrong.

The problems described above are not limited to a projector but common to an arbitrary apparatus having a lens and a mechanism that drives the lens. It has therefore been desired to develop a technology that cancels a backlash in a transmission mechanism for accurate movement of a lens and does not cause a user to feel something is wrong. In relation to a lens drive apparatus of related art, it has also been desired, for example, to reduce the size, lower the cost, save resources, simplify manufacturing processes, and to improve the degree of ease of use of the apparatus.

SUMMARY

An advantage of some aspects of the invention is to solve at least a part of the problems described above, and the invention can be implemented in the form of the following aspects.

(1) According to an aspect of the invention, a lens position adjustment is provided. The lens position adjustment apparatus includes a transmission unit that is displaced in a first direction oriented from one end point of a displaceable range of the transmission unit toward the other end point thereof or a second direction oriented from the other end point toward the one end point to transmit power outputted from a drive source, a conversion unit that is connected to the transmission unit and moves a lens by using the power supplied from the transmission unit, a drive control unit that controls the drive source, a position detection unit that detects a current position of the transmission unit, and a storage unit that stores a registered position that is a pre-registered position in the displaceable range and a registered direction that is a pre-registered displacement direction of the transmission unit with the registered position and the registered direction related to each other, and when a return control process in which the drive source is so driven that the lens is moved from the current position to the registered position is carried out, the drive control unit controls the drive source in such a way that a final displacement direction in which the lens is moved from the current position to the registered position is the second direction irrespective of the registered direction in case that the registered position is within a predetermined amount of displacement from the one end point, and the drive source in such a way that the final displacement direction in which the lens is moved from the current position to the registered position is the registered direction in case that the registered position does not fall within the predetermined amount of displacement from the one end point. According to the thus configured lens position adjustment apparatus, when the position to be registered is within a predetermined amount of displacement from one end point of the displaceable range, the drive source is so controlled that the final displacement direction in which the lens is moved from the current position to the registered position is the second direction toward the one end point, whereby a backlash present in the transmission unit does not need to be eliminated because after the lens is moved from the current position to the registered position and when a fine adjustment is so further made that the lens is moved from the registered position toward the one end point, the displacement direction coincides with the final displacement direction. As a result, since the position of the lens is changed at the same time when the fine adjustment is initiated, a user does not feel something is wrong. When the registered position is within the predetermined amount of displacement from the one end point and the lens is moved from the current position to the registered position, the user is likely to further adjust the position of the lens in such a way that the transmission unit is displaced toward the one end point. In the adjustment described above, the thus configured lens position adjustment apparatus prevents the user from feeling something is wrong. Additionally, when the registered position does not fall within the predetermined amount of displacement from the one end point, the effect of the backlash is eliminated and the lens can be accurately moved from the current position to the registered position because the drive source is so controlled that the final displacement direction in which the lens is moved to the registered position is the registered direction.

(2) In the lens position adjustment apparatus according to the aspect described above, the predetermined amount of displacement may be greater than or equal to an amount corresponding to a maximum amount of backlash present in the transmission unit. The lens position adjustment apparatus thus configured prevents, when the position to be registered is within a predetermined distance from the one end point, the predetermined amount being greater than or equal to an amount corresponding to the maximum amount of displacement, the user from feeling something is wrong after the lens is moved from the current position to the registered position and when the user makes a fine adjustment of the current position.

(3) The lens position adjustment apparatus according to the aspect described above may be configured such that the lens position adjustment apparatus further includes a registration controller that identifies the registered position and the displacement direction and stores the identified registered position and displacement direction in the storage unit, the drive control unit performs registration control in which the drive source is so controlled that the registration controller identifies the registered position and the displacement direction and supplies the transmission unit at least for a predetermined period with small-torque power, the power being a predetermined torque and shifting the lens from the current position in the second direction, when the registration control is performed on condition not only that the registered position is within the predetermined amount of displacement distance from the one end but also that when the registration controller identifies the registered position, the lens is moved from the current position in the first direction and reaches the registered position, and the registration controller stores the current position obtained as a result of the action of supplying the transmission unit with the small-torque power at least for the predetermined period performed by the drive control unit in the storage unit as the registered position and also stores the displacement direction obtained as a result of the action of supplying the transmission unit with the small-torque power at least for the predetermined period performed by the drive control unit in the storage unit as the registered direction. According to the thus configured lens position adjustment apparatus, when the position to be registered is within the predetermined amount of displacement from the one end point and the lens is moved from the current position in the first direction and reaches the registered position when the registered position is identified, small-torque power is supplied to the transmission unit at least for a predetermined period, whereby the final displacement direction (registered direction) is allowed to be the second direction with the backlash eliminated.

Therefore, when the return control process is carried out, the direction in which the lens is moved from the current position to the registered position is allowed to coincide with the registered direction.

(4) In the lens position adjustment apparatus according to the aspect described above, the predetermined torque may be large enough to displace the transmission unit but too small to move the lens. According to the thus configured lens position adjustment apparatus, when the position to be registered is within the predetermined amount of displacement from the one end point and the lens is moved from the current position in the first direction and reaches the registered position when the registered position is identified, the backlash can be eliminated without any change in the position of the lens.

(5) In the lens position adjustment apparatus according to the aspect described above, the predetermined period may be longer than or equal to a period necessary for power smaller than or equal to the predetermined torque to displace the transmission unit by an amount corresponding to the maximum amount of backlash present in the transmission unit. According to the thus configured lens position adjustment apparatus, since the maximum amount of backlash present in the transmission unit can be eliminated, a phenomenon in which the lens position does not change before the backlash is eliminated will not occur after the lens is moved from the current position to the registered position and when a fine adjustment of the lens position is made.

(6) According to another aspect of the invention, a projector including any of the lens position adjustment apparatus described above is provided.

All the plurality of components in the aspects of the invention described above are not essential, but part of the plurality of components can be changed, omitted, and replaced with new other components as appropriate, and part of the limiting conditions can be omitted as appropriate in order to solve part or all of the problems described above or achieve part or all of the advantageous effects described herein. Further, in order to solve part or all of the problems described above or achieve part or all of the advantageous effects described herein, part or all of the technical features contained in the aspects of the invention described above can be combined with part or all of the technical features contained in another aspect of the invention described above to form an independent aspect of the invention.

For example, one aspect of the invention can be implemented as an apparatus including at least one of the following five elements: the transmission unit; the conversion unit; the drive control unit; the position detection unit; and the storage unit. That is, the apparatus may or may not include the transmission unit. Further, the apparatus may or may not include the conversion unit. The apparatus may or may not include the drive control unit. The apparatus may or may not include the position detection unit. The apparatus may or may not include the storage unit. The transmission unit may, for example, be configured as a transmission unit is displaced in a first direction oriented from one end point of a displaceable range of the transmission unit toward the other end point thereof or a second direction oriented from the other end point toward the one end point to transmit power outputted from a drive source. The conversion unit may be configured as a conversion unit that is connected to the transmission unit and moves a lens by using the power supplied from the transmission unit. The drive control unit may be configured as a drive control unit that controls the drive source. The position detection unit may be configured as a position detection unit that detects a current position of the transmission unit. The storage unit may be configured as a storage unit that stores a registered position that is a pre-registered position in the displaceable range and a registered direction that is a pre-registered displacement direction of the transmission unit with the registered position and the registered direction related to each other. The apparatus described above can, for example, be implemented, but not necessarily, as a lens position adjustment apparatus and can also be implemented as an apparatus other than a lens position adjustment apparatus. For example, the apparatus described above can be implemented as a projector including a lens position adjustment apparatus. According to the aspects described above, at least one of a variety of challenges in relation to the apparatus described above, such as the projector, is achieved, such as reduction in size, reduction in cost, reduction in the amount of resources, reduction in power consumption, simplification of manufacturing processes, and improvement in ease of use. Part or all of the technical features in each of the aspects of the lens position adjustment apparatus described above can be applied to the apparatus described above.

The invention can be implemented in a variety of aspects in addition to an apparatus. For example, the invention can be implemented as a lens position adjustment method, a computer program that provides the method, and a permanent recording medium on which the computer program is recorded.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiment

Figure 1:
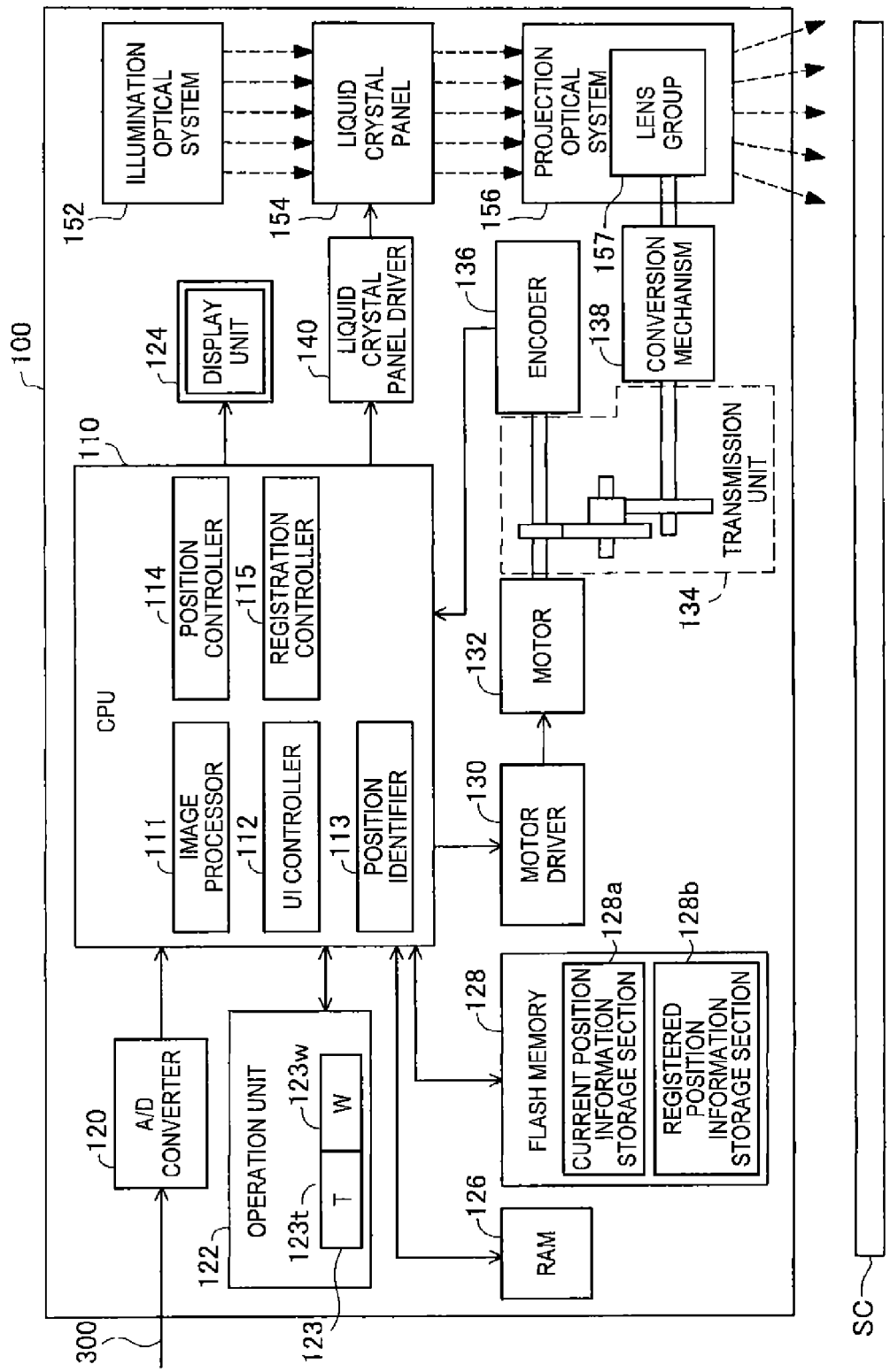
FIG. 1 is a block diagram showing a schematic configuration of a projector provided with a lens position adjustment apparatus as an embodiment of the invention.

A1. Apparatus Configuration:

FIG. 1 is a block diagram showing a schematic configuration of a projector provided with a lens position adjustment apparatus as an embodiment of the invention. A projector 100 includes an A/D converter 120, a CPU (central processing unit) 110, a motor driver 130, a motor 132, a transmission unit 134, a conversion mechanism 138, an illumination system 152, a liquid crystal panel 154, a projection system 156, an encoder 136, a liquid crystal panel driver 140, an operation unit 122, a display unit 124, a flash memory 128, and a RAM (random access memory) 126.

The A/D converter 120 receives an analog image signal (video signal) outputted from a DVD player or a personal computer (not shown) and outputs a digital image signal. The CPU 110, which reads a control program from the flash memory 128, loads the program in the RAM 126, and executes the program, functions as an image processor 111, a UI (user interface) controller 112, a position identifier 113, a position controller 114, and a registration controller 115.

The image processor 111 writes image data on a frame basis (frame image data) to the RAM 126 based on the digital image signal outputted from the A/D converter 120. The image processor 111 further adjusts the resolution, brightness, sharpness, contrast, and other parameters of each frame image. The UI controller 112 produces a variety of menu images and sets a variety of parameters based on values inputted through the operation unit 122. Examples of the variety of parameters include parameters used in the image processing (such as resolution conversion and sharpness adjustment) and a color mode. The position identifier 113 acquires a value from the encoder 136 (hereinafter referred to as "encoder value") and identifies the position of a lens that will be described later based on the encoder value. The position controller 114 controls the position of a group of a variety of lenses 157 provided in the projection system 156 by controlling the motor driver 130. The registration controller 115 carries out a lens position registration process, which will be described later.

The motor driver 130 is connected to the CPU 110 and the motor 132 and controls the motor 132 in accordance with an instruction from the CPU 110 (position controller 114). The motor 132 serves as a drive source that moves the lens group 157, which will be described later. The motor 132 can be driven forward and backward. The transmission unit 134 is mechanically connected to the motor 132 and the conversion mechanism 138, converts the power of the motor 132 into an appropriate speed, and transmits the power to the conversion mechanism 138. The transmission unit 134 is formed, for example, of what is called a reduction mechanism that is a combination of a plurality of gears, and a backlash is present in the transmission unit 134. The conversion mechanism 138 is mechanically connected to the transmission unit 134 and part of the lenses that form the lens group 157 and converts the power transmitted from the transmission unit 134 into power in the direction in which the lens is moved. The lens connected to the conversion mechanism 138 is, for example, a zoom lens, a focus lens, or a shift lens (projection lens).

The illumination system 152 includes a light emitting member and illuminates the liquid crystal panel 154 with illumination light. The light emitting member can, for example, be a high-pressure mercury lamp, a semiconductor laser array, or a visible-light LED. The liquid crystal panel 154 is connected to the liquid crystal panel driver 140 and modulates the illumination light having exited out of the illumination system 152 in accordance with a drive signal inputted from the liquid crystal panel driver 140. In the present embodiment, the liquid crystal panel 154 is a transmissive liquid crystal panel. The projection system 156, which includes the lens group 157, projects projection light that is the light modulated by the liquid crystal panel 154 on a screen Sc.

The encoder 136 is mechanically connected to the transmission unit 134 and electrically connected to the CPU 110. The encoder 136 detects the amount of displacement of one of the gears that form the transmission unit 134 and outputs a value corresponding to the position the lens (hereinafter referred to as "encoder value") based on the amount of displacement to the CPU 110. The gear that is part of the transmission unit 134 is displaceable in two directions opposite to each other (forward rotation and backward rotation) in accordance with the drive direction of the motor 132. The lens that is part of the lens group 157 is movable in two directions corresponding to the two displacement directions. The encoder 136 outputs the displacement direction of the gear (first direction or second direction, which will be described later) as well as the encoder value to the CPU 110. The encoder 136 can be formed, for example, of a disk connected to the output shaft of the motor 132 and having slits engraved at predetermined intervals and a light emitting diode and a photodiode disposed on opposite sides of the disk. The liquid crystal panel driver 140 is connected to the CPU 110 and the liquid crystal panel 154 and outputs a drive signal to the liquid crystal panel 154 based on the image data having undergone the image processing performed by the CPU 110 (image processor 111). The operation unit 122 has a variety of operation buttons, such as a zoom button 123. The zoom button 123 is formed of a tele-side button 123*t* for moving the zoom lens toward the tele side and a wide-side button 123*w* for moving the zoom lens toward the wide side. The display unit 124 displays a variety of menu screens.

The flash memory 128, which stores the control program described above, has a current position information storage section 128*a* and a registered position information storage section 128*b*. The current position information storage section 128*a* stores a current encoder value and a current displacement direction of the gear notified from the encoder 136. The encoder 136 regularly notifies the CPU 110 of the encoder value and the displacement direction, and the CPU 110 overwrites the encoder value and displacement direction stored in the current position information storage section 128*a* with the notified encoder value and displacement direction and records them. The registered position information storage section 128*b* stores an encoder value and a final displacement direction. The final displacement direction means the final displacement direction of the gear in which an encoder value to be registered has been reached in a lens position registration process, which will be described later. The encoder value registered in the registered position information storage section 128*b* is read in a lens position return process, which will be described later, and allows the lens to return to a desired lens position by driving the motor 132 in such a way that the current encoder value (hereinafter referred to as "current position") changes to the registered encoder value.

Figure 2:
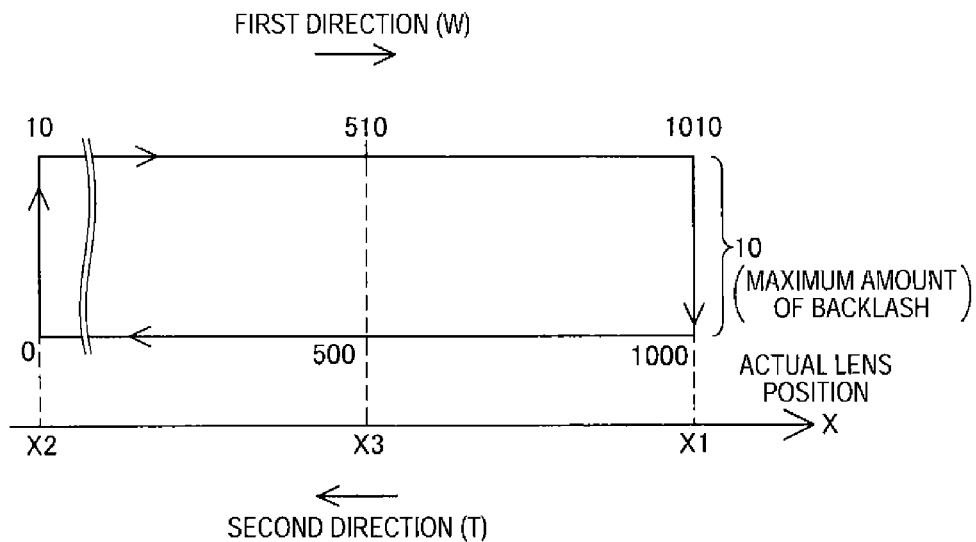
FIG. 2 is a descriptive diagram showing the relationship between an encoder value and an actual lens position.

FIG. 2 is a descriptive diagram showing the relationship between the encoder value and the actual lens position. The following description will be made with reference to the zoom lens as a representative of a lens whose position is adjusted. In FIG. 2, the upper portion shows the range of possible encoder values, and the lower portion shows the actual lens position.

Possible encoder values range from "0" to "1010", as shown in the upper portion of FIG. 2. When the encoder value is "0", the zoom lens is located in a position closest to the tele side and the lens position is "X2". When the user presses the wide-side button 123*w* in this state, the encoder value increases. Assuming that the transmission unit 134 has a backlash corresponding to an encoder value of "10" at maximum, the zoom lens does not move until the encoder value increases from 0 to 10, and the lens position remains at "X2". When the user further presses the wide-side button 123*w*, the encoder value becomes greater than "10" and the zoom lens starts moving toward the wide side. In the example shown in FIG. 2, when the encoder value is "510," the actual lens position is "X3". The encoder value keeps increasing, and when the encoder value reaches "1010", an end point (X1) of the lens movable range is reached, and the zoom lens stops moving. When the user presses the tele-side button 123*t* in this state, the motor 132 is driven backward, and the encoder value decreases. However, before the entire amount of backlash is eliminated, that is, the encoder value changes from 1010 to 1000, the zoom lens does not move and the lens position remains at "X1". When the user further presses the tele-side button 123*t*, the encoder value becomes smaller than "1000" and the zoom lens starts moving toward the tele side. In the example shown in FIG. 2, when the encoder value is "500," the lens position is "X3", as in the case described above where the encoder value is "510". When the encoder value keeps decreasing and reaches "0", the lens position becomes "X2" described above, which corresponds to the other end point of the lens movable range. As described above, even when the encoder value obtained in the state in which the displacement direction of the transmission unit 134 is oriented toward the wide side of the zoom lens (hereinafter referred to as "first direction") is the same as the encoder value obtained in the state in which the displacement direction of the transmission unit 134 is oriented toward the tele side of the zoom lens (hereinafter referred to as "second direction"), the actual lens positions differ from each other because the backlash is present in the transmission unit 134.

The CPU 110, the motor driver 130, the transmission unit 134, the encoder 136, and the conversion mechanism 138 described above correspond to the lens position adjustment apparatus in the appended claims. Further, the position controller 114 and the motor driver 130 correspond to the drive control unit in the appended claims. The encoder 136 corresponds to the position detection unit in the appended claims. The flash memory 128 corresponds to the storage unit in the appended claims. Assuming that the encoder value "1010" corresponds to the one end point in the appended claims and the encoder value "0" corresponds to the other end point in the appended claims, the first direction shown in FIG. 2 corresponds to the second direction in the appended claims and the second direction shown in FIG. 2 corresponds to the first direction in the appended claims. Conversely, assuming that the encoder value "0" corresponds to the one end point in the appended claims and the encoder value "1010" corresponds to the other end point in the appended claims, the first direction shown in FIG. 2 corresponds to the first direction in the appended claims and the second direction shown in FIG. 2 corresponds to the second direction in the appended claims.

Figure 3:
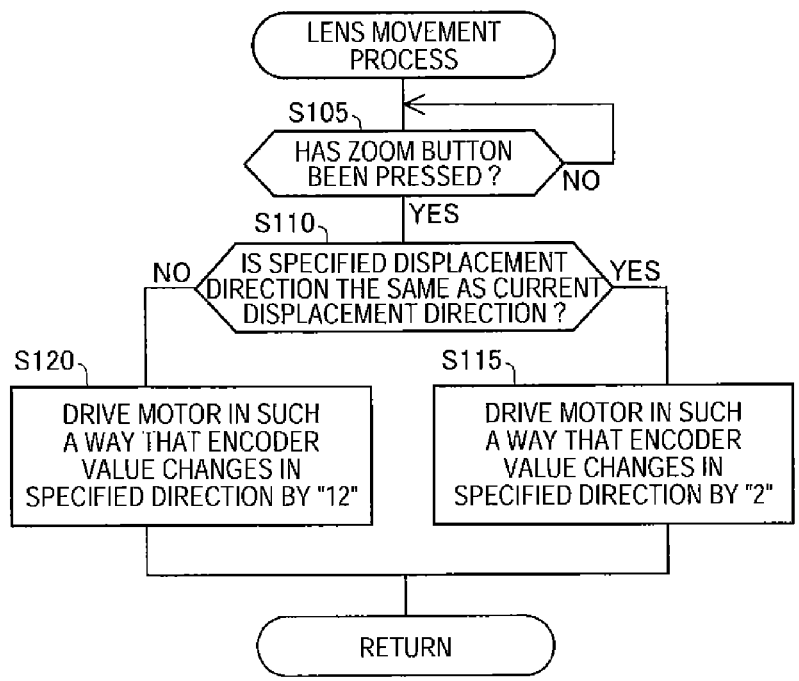
FIG. 3 is a flowchart showing the procedure of a lens movement process in the present embodiment.

A2. Lens Movement Process:

FIG. 3 is a flowchart showing the procedure of a lens movement process in the present embodiment. When the user presses the wide-side button 123w or the tele-side button 123t, the zoom lens moves toward the wide side or the tele side in the movable range of the zoom lens, as described above. In the projector 100, the action described above is done as a lens movement process. When the projector 100 is powered on, the lens movement process starts.

The position controller 114 waits until the zoom button 123 (wide-side button 123w or tele-side button 123t) is pressed (step S105). When the zoom button 123 is pressed (step S105: YES), the position controller 114 determines whether or not the displacing direction of the transmission unit 134 specified by the pressed zoom button is the same as the current displacement direction (step S110). Specifically, for example, when the wide-side button 123w is pressed, the transmission unit 134 (gears) is instructed to be displaced in the first direction, and the position controller 114 compares the first direction with the current displacement direction recorded in the current position information storage section 128a.

When the determination results shows that the specified displacement direction is the same as the current displacement direction (step S110: YES), the position controller 114 controls the motor driver 130 to drive the motor 132 in such a way that the encoder value changes in the specified direction by "2" (step S115). On the other hand, when the determination results in step S110 described above shows that the specified displacement direction is not the same as the current displacement direction (step S110: NO), the position controller 114 controls the motor driver 130 to drive the motor 132 in such a way that the encoder value changes in the specified direction by "12" (step S115).

Figure 4A:
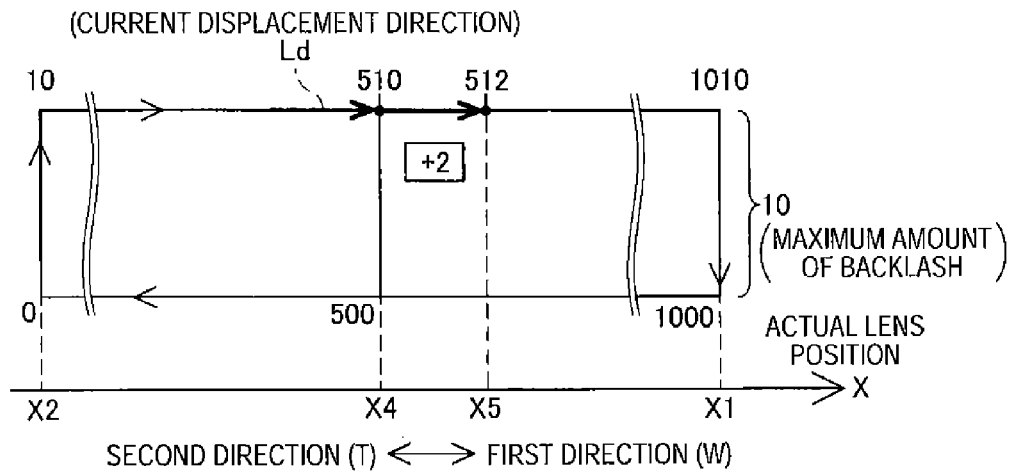
FIGS. 4A and 4B are descriptive diagrams showing examples of changes in the encoder value and the lens position after the execution of the lens movement process.
Figure 4B:
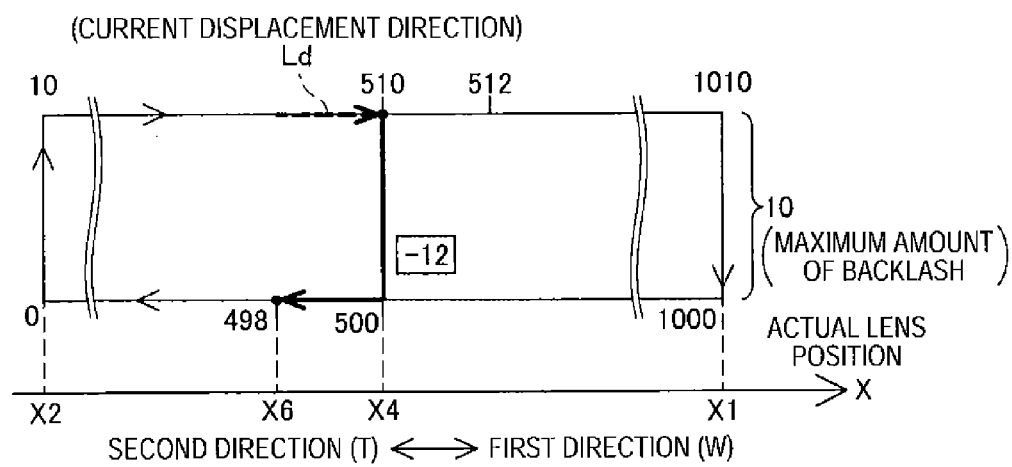

FIGS. 4A and 4B are descriptive diagrams showing examples of changes in the encoder value and the lens position after the execution of the lens movement process. FIG. 4A shows an example of changes in the encoder value and the lens position after the execution of step S115 described above, and FIG. 4B shows an example of changes in the encoder value and the lens position after the execution of step S120 described above.

In a state in which the current displacement direction Ld is the first direction and the current position is 510 (actual lens position is "X4"), when the user presses the wide-side button 123w, step S115 described above is executed, and the encoder value increases by 2 and changes to 512, as shown in FIG. 4A. At this point, the lens position becomes "X5".

On the other hand, in the state in which the current displacement direction Ld is the first direction and the current position is 510, when the user presses the tele-side button 123t, step S120 described above is executed, and the encoder value decreases by 12 and changes to 498, as shown in FIG. 4B. In this process, the current displacement direction Ld and the second direction (direction toward tele side) are opposite to each other. In this case, since the backlash (10) is not eliminated until the encoder value decreases from 510 by 10, the lens position remains at X4. When the encoder value becomes smaller than 500, the lens starts moving, and when the encoder value reaches 498, the lens stops moving.

The reason why the amount of displacement is small when the specified displacement direction coincides with the current displacement direction Ld, whereas the amount of displacement is large when the specified displacement direction does not coincide with the current displacement direction Ld (in reverse situation) as described above is as follows: When the specified displacement direction coincides with the current displacement direction Ld, the backlash has been already eliminated at the start of the displacement of the transmission unit 134 and hence the lens can immediately move. On the other hand, when the specified displacement direction does not coincide with the current displacement direction Ld (in reverse situation), the backlash first needs to be eliminated at the start of the displacement of the transmission unit 134. The amount of displacement is therefore so increased that single pressing operation of the zoom button 123 eliminates the backlash and moves the lens in a direction that user desires, whereby the user will not feel something is wrong because the lens moves immediately after the zoom button 123 is pressed.

Figure 5:
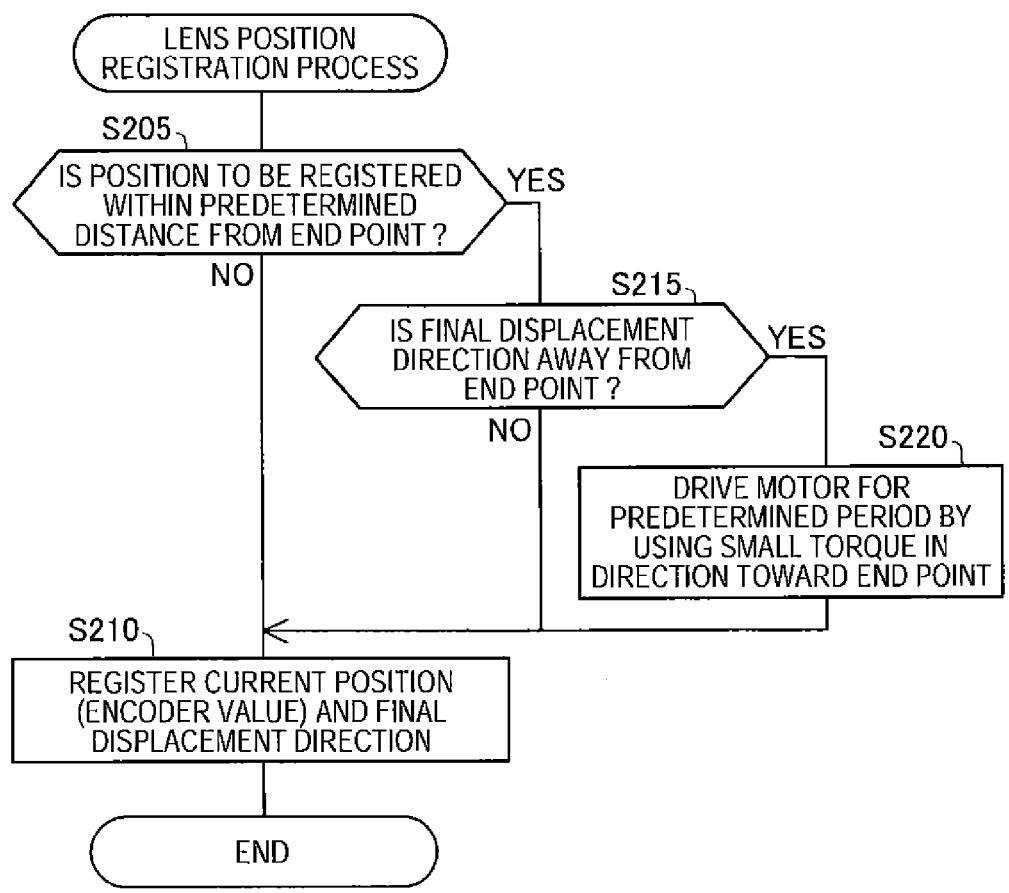
FIG. 5 is a flowchart showing the procedure of a lens position registration process in the present embodiment.

A3. Lens Position Registration Process:

FIG. 5 is a flowchart showing the procedure of a lens position registration process in the present embodiment. In the projector 100, as long as an arbitrary position of the zoom lens is registered in advance, the zoom lens can be moved (returned) to the position registered in advance by specifying the registered position. After the user operates the zoom button 123 to move the zoom lens to a desired position, and when the user operates the operation unit 122 to display a menu screen for lens position registration in the display unit 124 and executes the menu, the lens position registration process starts in the projector 100.

The registration controller 115 determines whether or not the position to be registered (encoder value) is within a predetermined distance (value) from an end point (0 or 1010) of the range of possible encoder values (step S205). In the present embodiment, the predetermined distance is set at "20", which is twice as long as the maximum amount of backlash (10) in the transmission unit 134.

When the position to be registered is outside the predetermined distance from the end point (step S205: NO), the registration controller 115 stores (registers) the current encoder value and final displacement direction in the registered position information storage section 128b (step S210).

In step S205 described above, when the position to be registered is within the predetermined distance from the end point (step S205: YES), the registration controller 115 determines whether or not the final displacement direction is the direction away from the end point (end point closer to current position) (step S215). When the determination result shows that the final displacement direction (the final displacement direction of the transmission unit 134 in which the user has moved the zoom lens to a desired position) is not the direction away from the end point (that is, when the final displacement direction is the direction toward the end point), step S210 described above is executed.

When the determination result in step S215 described above shows that the final displacement direction is the direction away from the end point (step S215: YES), the registration controller 115 controls the position controller 114 to drive the motor 132 for a predetermined period by using a small torque in the direction toward the end point (step S220). In the present embodiment, the small torque means a torque large enough to displace the transmission unit 134 but too small to move the lens group 157. When the motor 132 is driven by using such a small torque, the backlash in the transmission unit 134 can be eliminated without any change in the lens position. When the motor 132 can be controlled based on PWM (pulse width modulation), the torque of the motor 132 can be adjusted by adjusting the duty ratio (ratio of the pulse width or a High period to the cycle). That is, the torque can be lowered by reducing the duty ratio. Instead of by adjusting the duty ratio, the torque can alternatively be lowered by reducing the voltage supplied to the motor 132 or reducing the current supplied to the motor 132.

Figure 6A:
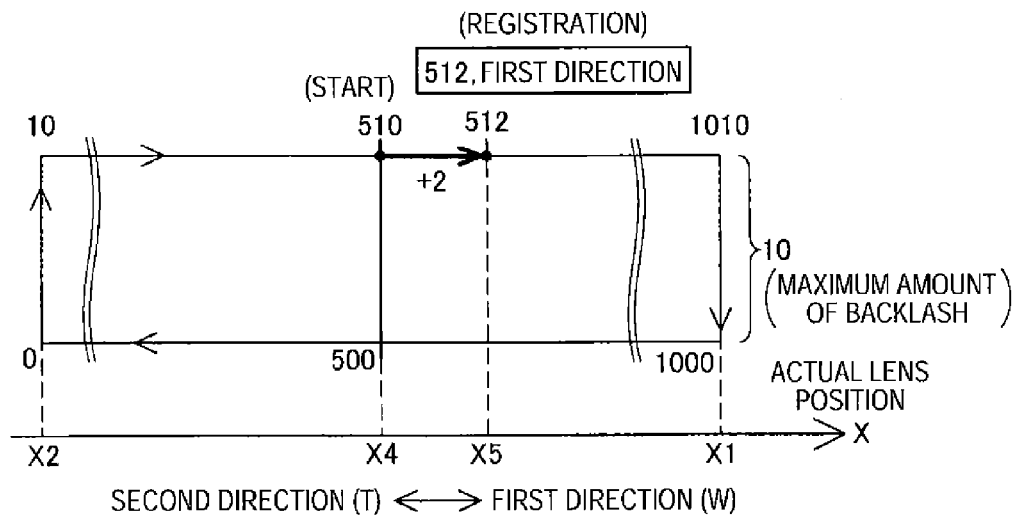
FIGS. 6A and 6B are descriptive diagrams showing examples of changes in the encoder value and the lens position after the execution of a lens position registration process.
Figure 6B:
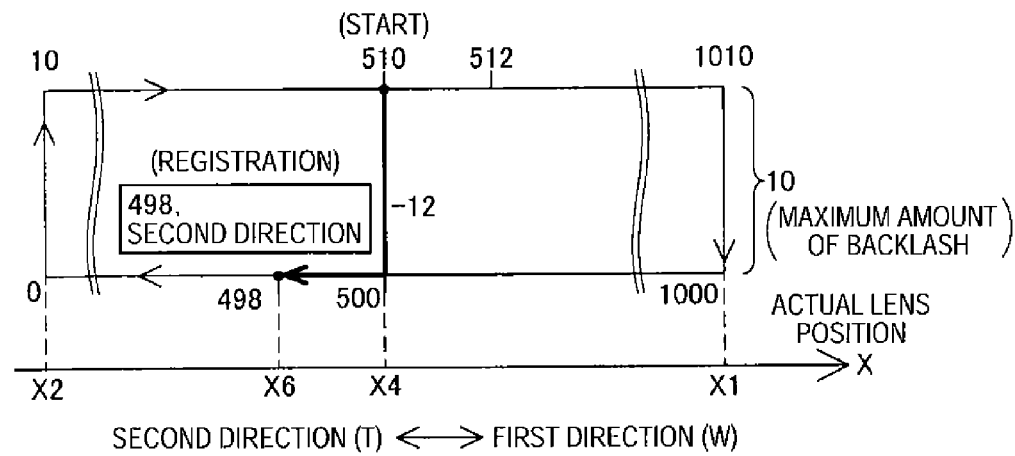
Figure 7A:
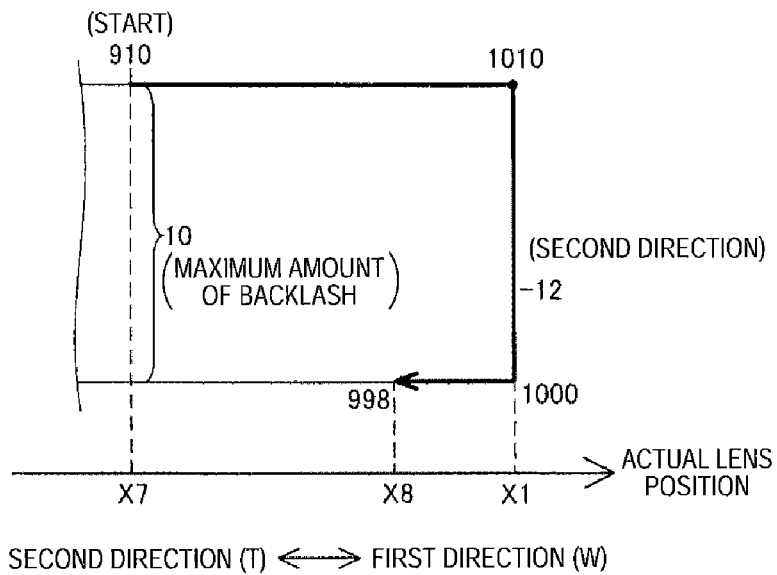
FIGS. 7A and 7B are descriptive diagrams showing examples of changes in the encoder value and the lens position after the execution of the lens position registration process.
Figure 7B:
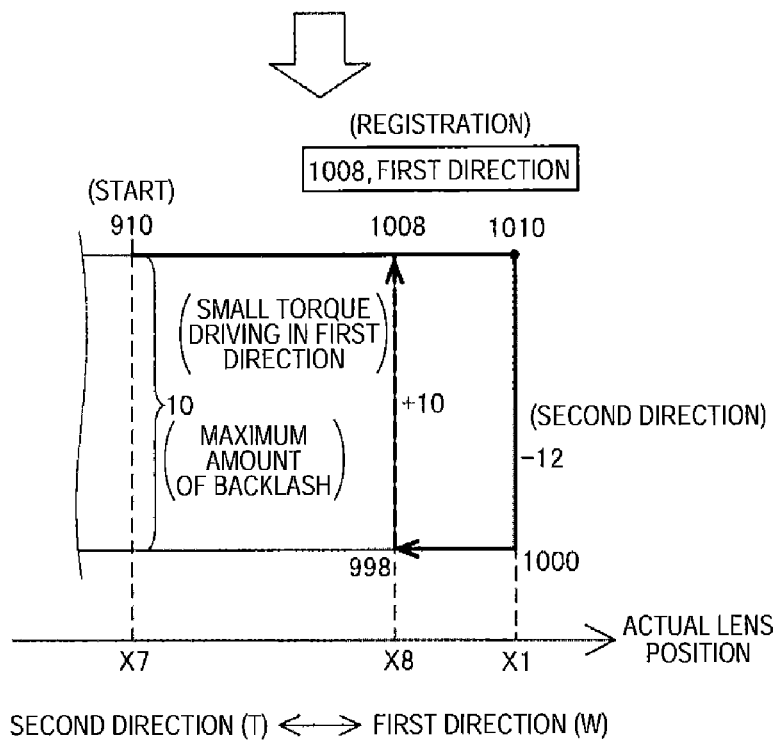

FIGS. 6A and 6B and FIGS. 7A and 7B are descriptive diagrams showing examples of changes in the encoder value and the lens position after the execution of the lens position registration process. FIG. 6A shows an example of changes in the encoder value and the lens position in a case where the final displacement direction is the first direction, and FIG. 6B shows an example of changes in the encoder value and the lens position in a case where the final displacement direction is the second direction. FIGS. 6A and 6B both show a case where the registered position is outside the predetermined distance (10) from an end point (step S205: NO). FIGS. 7A and 7B show a case where the registered position is within the predetermined distance (10) from the end point (step S205: YES) and the final displacement direction is the direction away from the end point (step S215: YES).

When the lens position registration process is carried out after the user presses the wide-side button 123w once in a state in which the encoder value is 510 so that the encoder value becomes 512, steps S205 and S210 described above are executed and the encoder value of "512" and the first direction are registered, as shown in FIG. 6A.

When the lens position registration process is carried out after the user presses the tele-side button 123t once in the state in which the encoder value is 510 so that the encoder value becomes 498, steps S205 and S210 described above are executed and the encoder value of "498" and the second direction are registered, as shown in FIG. 6B.

When the user presses the wide-side button 123w multiple times in a state in which the encoder value is 910 so that the encoder value becomes 1010 and then presses the tele-side button 123t once, the encoder value decreases in the first direction (toward the tele side) by 12 and becomes 998, as shown in FIG. 7A. When the lens position registration process is carried out in this state, steps S205, S215, and S220 described above are executed in this order because the registered position (encoder value) is 998, which is within the predetermined distance (20) from the end point (1010) of the range of possible encoder values. When step S220 is executed, the encoder value increases by "10", which corresponds to the maximum amount of backlash, and becomes 1008, whereas the lens position remains at X8, as shown in FIG. 7B. In other words, in step S220, when the motor 132 is so driven by using a small torque that the transmission unit 134 is displaced in the first direction, the transmission unit 134 is displaced in the first direction by the amount of displacement (10) corresponding to the maximum amount of backlash to eliminate the backlash but cannot move the lens because the torque is not large enough to do so. The displacement of the transmission unit 134 stops at this point. As a result of the action described above, the encoder value "1008" and the first direction are stored (registered) in the registered position information storage section 128b.

Figures 8, 9:
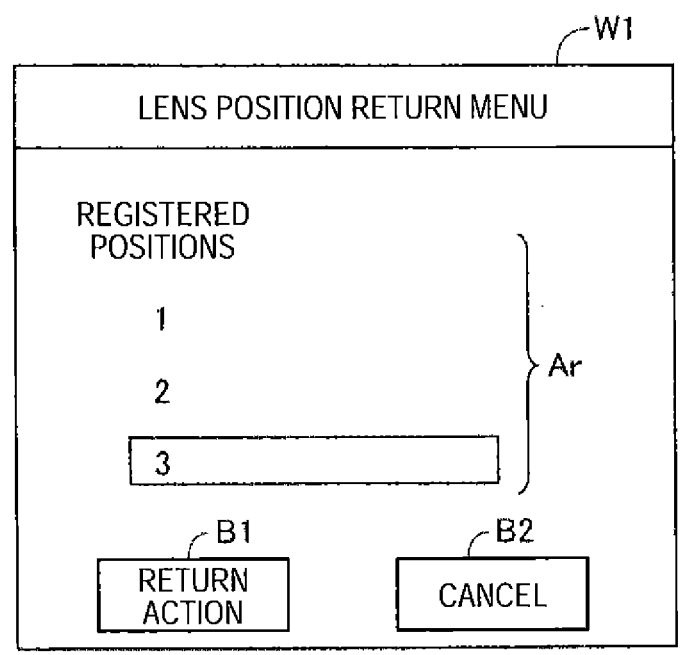
FIG. 8 is a descriptive diagram showing examples of the encoder value and a final displacement direction stored in a registered position information storage section.
FIG. 9 is a descriptive view showing a lens position return menu screen in the present embodiment.

FIG. 8 is a descriptive diagram showing examples of the encoder value and the final displacement direction stored in the registered position information storage section 128b. FIG. 8 shows the encoder values and the final displacement directions registered in the registered position information storage section 128b when the lens position registration process is carried out as shown in FIGS. 6A and 6B and FIGS. 7A and 7B described above.

An encoder value and a final displacement direction are registered with the two types of information related to each other in the registered position information storage section 128b, as shown in FIG. 8. Specifically, the encoder value of "512" and the "first direction" are stored as a record No. 1. Further, the encoder value of "498" and the "second direction" are stored as a record No. 2, and the encoder value of "1008" and the "first direction" are stored as a record No. 3. The record No. 1 is a record registered when the lens position registration process is carried out as shown in FIG. 6A. The records No. 2 and No. 3 are records registered when the lens position registration process is carried out as shown in FIG. 6B and FIGS. 7A and 7B, respectively.

A4. Lens Position Return Process:

FIG. 9 is a descriptive diagram showing a lens position return menu screen in the present embodiment. When the user attempts to move the zoom lens to a registered position, the user operates the operation unit 122 to display a lens position return menu screen W1 shown in FIG. 9 on the display unit 124. The lens position return menu screen W1 has a registered position selection area Ar, a return action button B1, and a cancel button B2. The registered position selection area Ar displays a number corresponding to each record registered in the registered position information storage section 128b. When the user selects any of the numbers and presses the return action button B1, the lens position return process is carried out in the projector 100. In the example shown in FIG. 9, "3" (that is, record No. 3 shown in FIG. 8) has been selected as the registered position.

Figure 10:
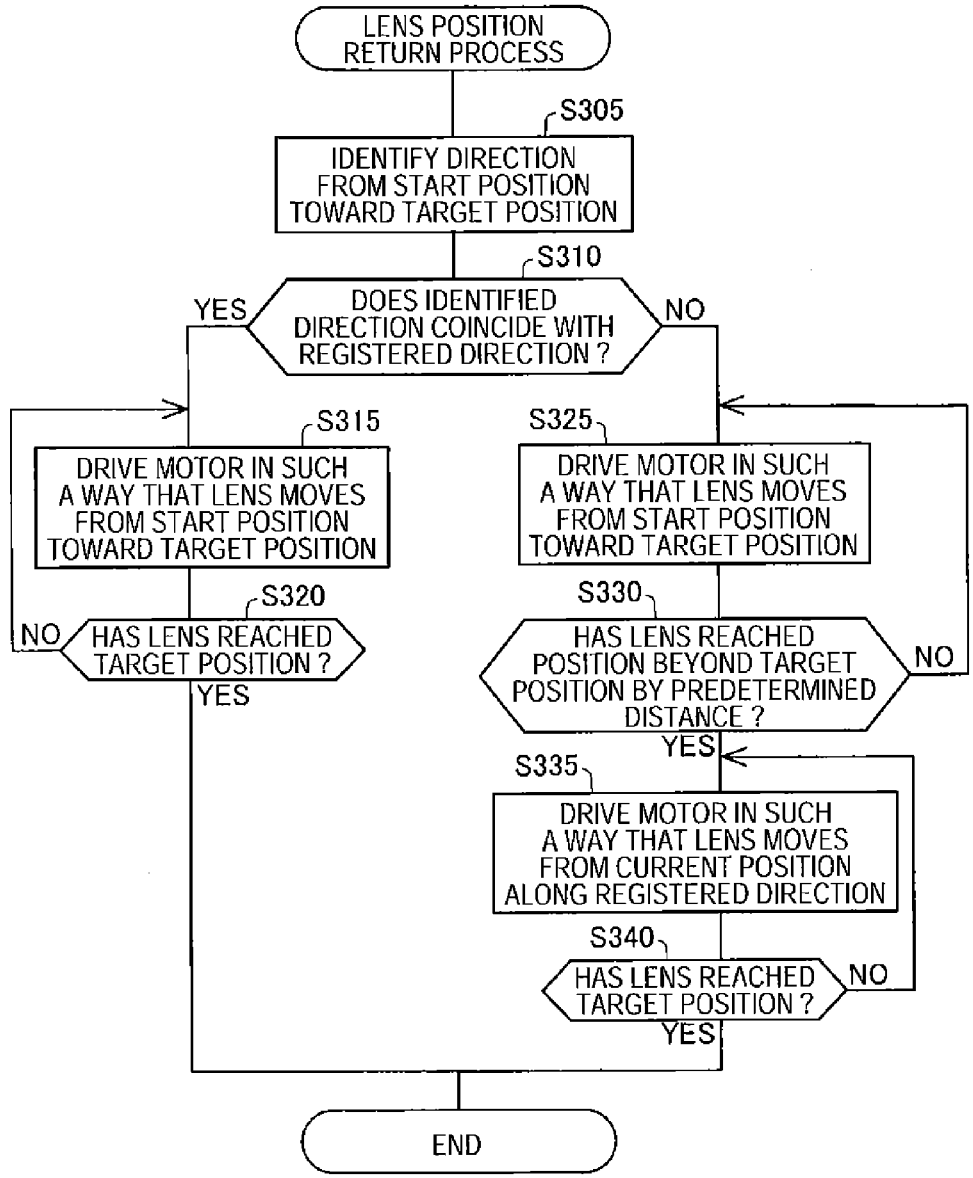
FIG. 10 is a flowchart showing the procedure of a lens position return process in the present embodiment.

FIG. 10 is a flowchart showing the procedure of the lens position return process in the present embodiment. At the start of the lens position return process, based on the current position (start position) stored in the current position information storage section 128a and the selected registered position (target position) stored in the registered position information storage section 128b, the position controller 114 identifies the direction from the start position toward the target position (displacement direction of conversion mechanism 138) (step S305). The position controller 114 determines whether or not the direction identified in step S305 coincides with the final displacement direction registered in the registered position information storage section 128b at the start of the lens position return process (hereinafter also referred to as "registered direction") (step S310).

When the determination result in step S310 described above shows that the two directions coincide with each other (step S310: YES), the position controller 114 controls the motor driver 130 to drive the motor 132 in such a way that the lens moves from the start position toward the target position (step S315) and then determines whether or not the lens has reached the target position based on the encoder value notified from the encoder 136 (step S320). When the lens has not reached the target position (step S320: NO), the control returns to step S315 described above. On the other hand, when the lens has reached the target position (step S320: YES), the lens position return process is terminated.

When the determination result in step S310 described above shows that the two directions do not coincide with each other (step S310: NO), the position controller 114 controls the motor driver 130 to drive the motor 132 in such a way that the lens moves from the start position toward the target position (step S325) and determines whether or not the lens has reached a position beyond the target position by a predetermined distance (step S330). When the lens has not reached the position beyond the target position by the predetermined distance (step S330: NO), the control returns to step S325 described above. On the other hand, when the lens has reached the position beyond the target position by the predetermined distance (step S330: YES), the position controller 114 controls the motor driver 130 to drive the motor 132 in such a way that the lens moves from the current position along the registered direction (step S335). The predetermined distance in step S330 is set at "100" in the present example. The position controller 114 then determines whether or not the lens has reached the target position (step S340). When the lens has not reached the target position (step S340: NO), the control returns to step S335 described above. On the other hand, when the lens has reached the target position (step S340: YES), the lens position return process is terminated.

Figure 11A:
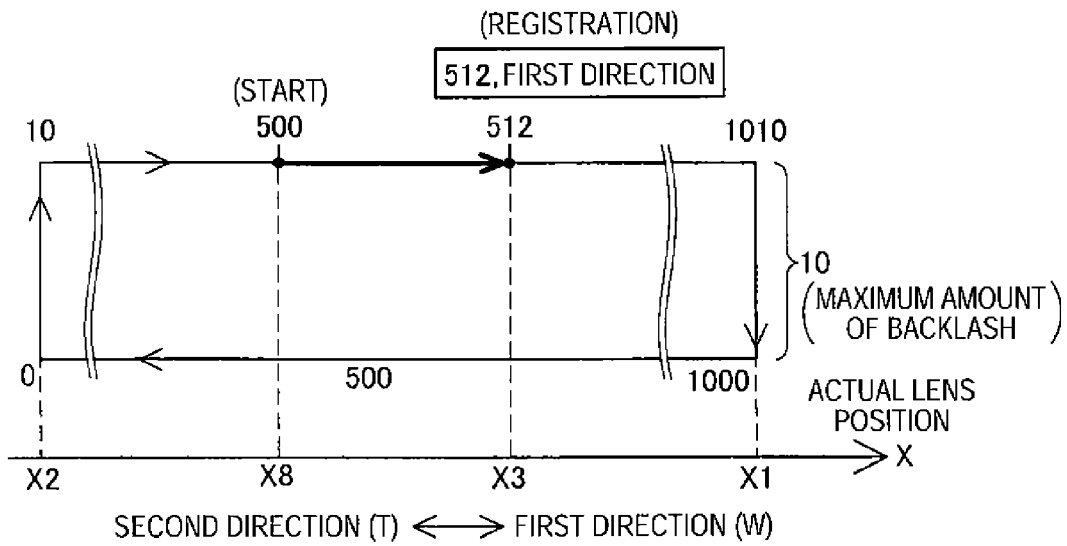
FIGS. 11A and 11B are descriptive diagrams showing examples of changes in the encoder value and the lens position after the execution of the lens position return process.
Figure 11B:
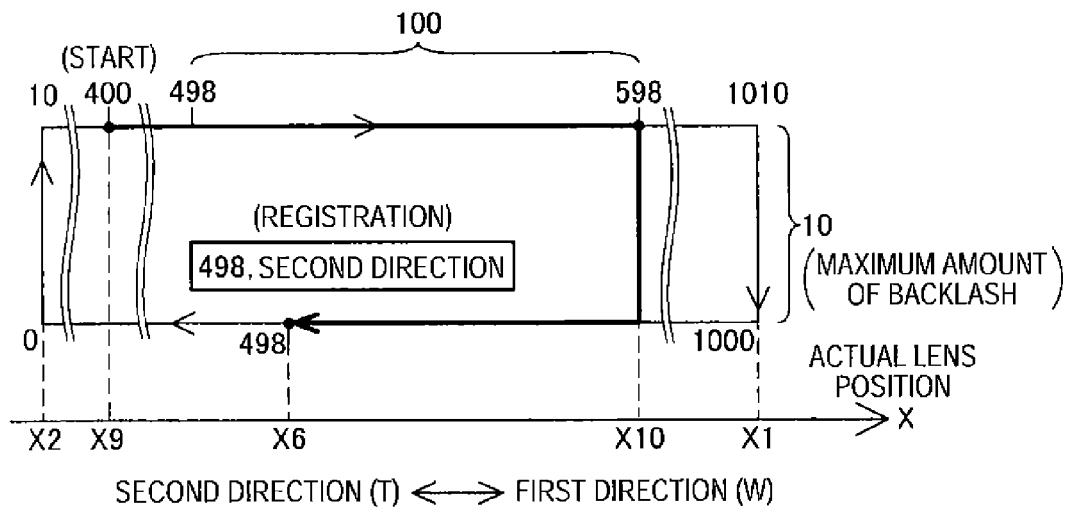
Figure 12:
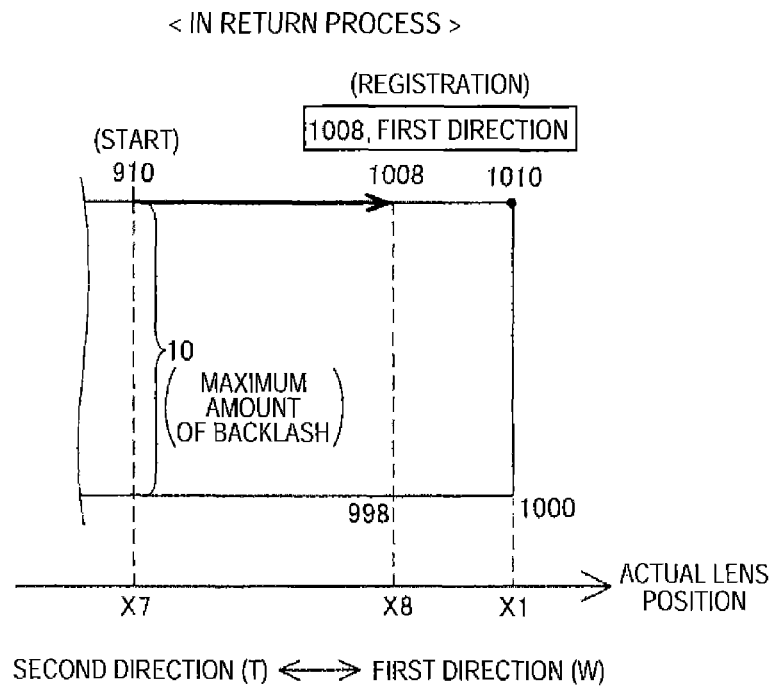
FIG. 12 is a descriptive diagram showing an example of changes in the encoder value and the lens position after the execution of the lens position return process.

FIGS. 11A and 11B and FIG. 12 are descriptive diagrams showing examples of changes in the encoder value and the lens position after the execution of the lens position return process. FIG. 11A shows an example of changes in the encoder value and the lens position in a case where the lens is returned to the registered position No. 1 shown in FIG. 8, and FIG. 11B shows an example of changes in the encoder value and the lens position in a case where the lens is returned to the registered position No. 2 shown in FIG. 8. FIG. 12 shows an example of changes in the encoder value and the lens position in a case where the lens is returned to the registered position No. 3 shown in FIG. 8.

As shown in FIG. 11A, in which the target position (encoder value) is "512", when the start position (encoder value) is "500", the direction from the start position toward the target position is the first direction. Since the direction from the start position toward the target position (first direction) coincides with the final displacement direction in the record No. 1 shown in FIG. 8 (first direction), step S315 is executed, so that the transmission unit 134 is displaced in the first direction and the lens reaches from the current position to the target position. The lens position return process changes the lens position from X8 to X3.

As shown in FIG. 11B, in which the target position is "498", when the start position is "400", the direction from the start position toward the target position is the first direction. The direction from the start position toward the target position (first direction) does not coincide with the final displacement direction in the record No. 2 shown in FIG. 8 (second direction). The transmission unit 134 is therefore first displaced in the first direction beyond the encoder value of "498", reaches an encoder value of "598", that is, an encoder value obtained by adding the predetermined distance (100) to the target position, and then starts being displaced in the second direction, which is the final displacement direction. In this case, the amount of maximum backlash (10) is first eliminated, and then the lens is moved in the second direction (toward tele side). The lens is thus displaced in the same direction as the registered final displacement direction and reaches the target position (498).

As shown in FIG. 12, in which the target position is "1008", when the start position is "910", the direction from the start position toward the target position is the first direction. Since the direction from the start position toward the target position (first direction) coincides with the final displacement direction in the record No. 3 shown in FIG. 8 (first direction), step S315 is carried out, so that the transmission unit 134 is displaced in the first direction and the lens reaches from the current position to the target position. The lens position return process changes the lens position from X7 to X8.

Figure 13:
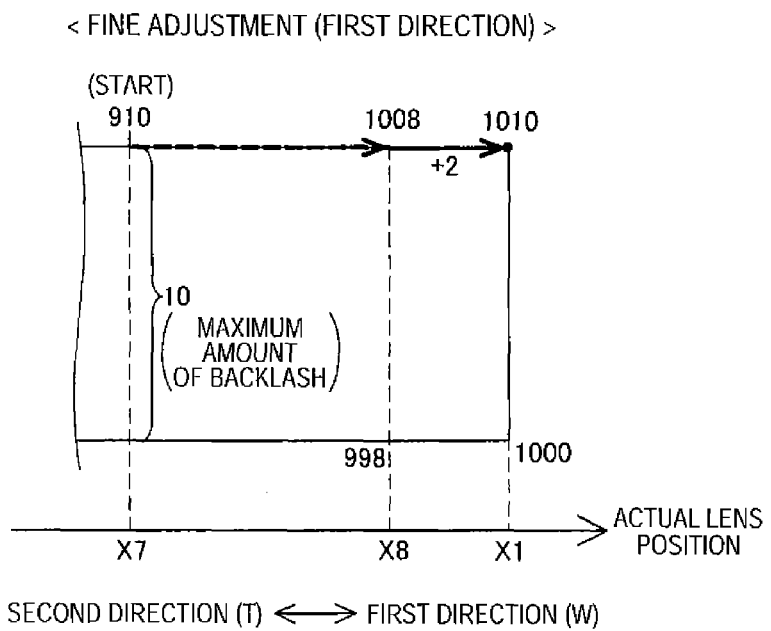
FIG. 13 is a descriptive diagram showing an example of changes in the encoder value and the lens position after the execution of the lens position return process shown in FIG. 12 followed by a fine adjustment of the lens position made by a user.

FIG. 13 is a descriptive diagram showing an example of changes in the encoder value and the lens position after the execution of the lens position return process shown in FIG. 12 followed by a fine adjustment of the lens position made by the user. After the lens position return process shown in FIG. 12 is carried out and the lens reaches the target position of "1008" from the current position, the user presses the wide-side button 123w once in order to make a fine adjustment of the position of the zoom lens toward the wide side. Since the position corresponding to the encoder value of "1008" is close to the end point "1010", the user is likely to make a fine adjustment of the current position in a direction toward a position closer to the end point after the lens is returned to the registered position. In this case, since the final displacement direction in the lens position return process is the first direction, the current position changes in the first direction by +2 as in FIG. 4A, and the encoder value becomes "1010". In this process, since no backlash needs to be eliminated, the actual lens position changes from X8 to X1 immediately after the wide-side button 123w is pressed. As described above, in the present embodiment, after the target position is reached and when the user presses the wide-side button 123w to change the current position to a position closer the end point, the user does not feel something is wrong because the lens starts moving immediately after the pressing operation.

Figure 14A:
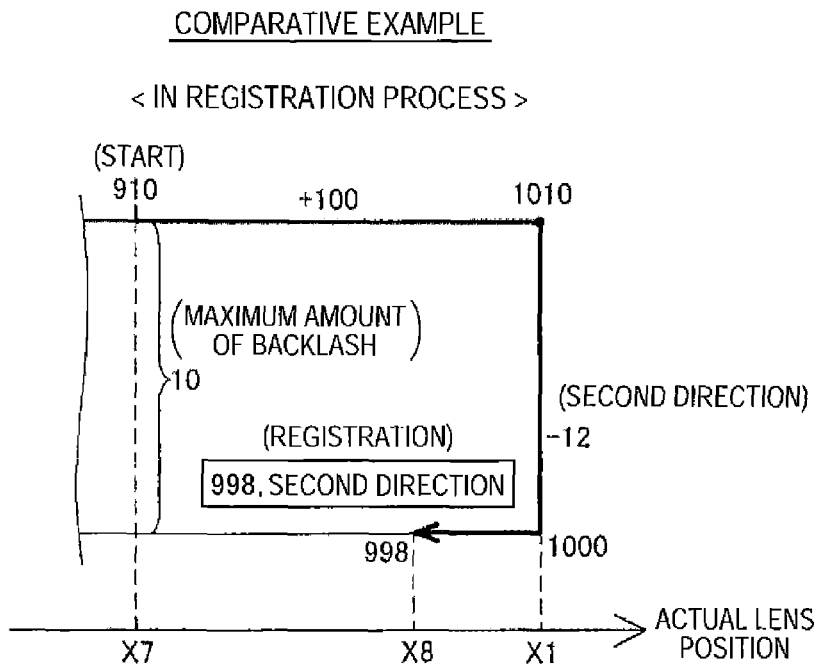
FIGS. 14A and 14B are descriptive diagrams showing examples of changes in the encoder value and the lens position after the execution of lens position registration and return processes in Comparison Example followed by a fine adjustment of the lens position made by the user.
Figure 14B:
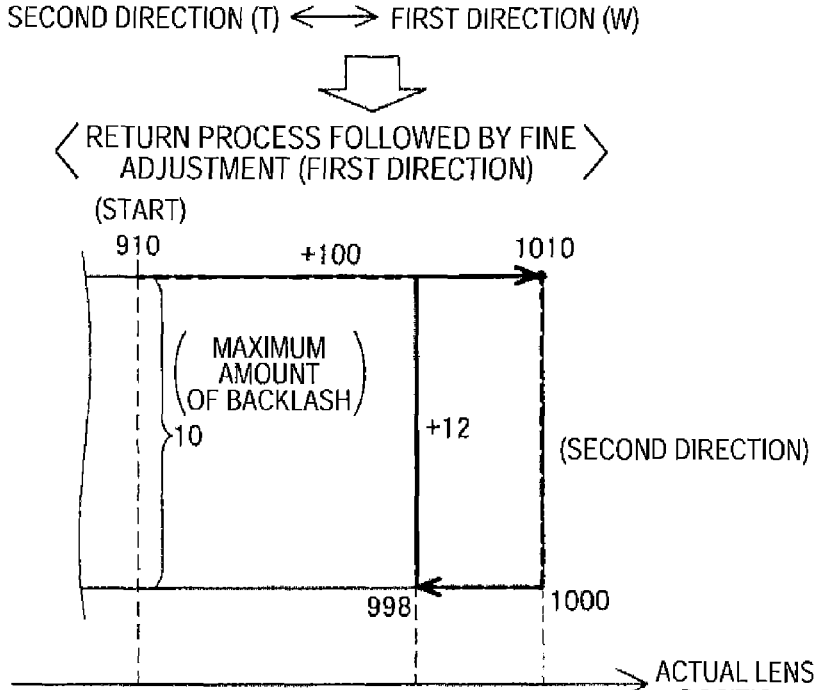

FIGS. 14A and 14B are descriptive diagrams showing examples of changes in the encoder value and the lens position after the execution of lens position registration and return processes in Comparative Example followed by a fine adjustment of the lens position made by the user. FIG. 14A shows an example of changes in the encoder value and the lens position after the execution of the lens position registration process in Comparative Example, and FIG. 14B shows an example of changes in the encoder value and the lens position after the execution of the lens position return process in Comparative Example followed by a fine adjustment of the lens position.

In Comparative Example, the position of the lens moved and stopped by the user and the displacement direction of the transmission unit 134 immediately before the lens is stopped are registered. Specifically, when the user presses the wide-side button 123w multiple times in a state in which the encoder value is 910 so that the encoder value becomes 1010 and then presses the tele-side button 123t once, the encoder value decreases in the first direction (toward tele side) by 12 and becomes 998, as shown in FIG. 14A. In this case, "998" is registered as the registered position, and the "second direction" is registered as the registered direction.

In the lens position return process according to Comparative Example, when the start position is a position where the encoder value is "910", the lens is displaced in the same manner as in the registration process and reaches a position where the encoder value is "998". In this state, the user presses the wide-side button 123w once in order to make a fine adjustment of the position of the zoom lens toward the wide side, as in FIG. 13. In this case, since the final displacement direction in the lens position return process is the second direction, which differs from the displacement direction in which the position of the zoom lens is adjusted toward the wide side (first direction), the backlash (maximum amount of backlash: 10) is first eliminated and then the lens is displaced in the first direction by +2, as in FIG. 4B. Therefore, after the wide-side button 123w is pressed, the lens position remains at X8 until the backlash is eliminated, and after the backlash is eliminated, the actual lens position changes from X8 to X1. In this case, the user feels something is wrong.

In contrast, in the projector 100 according to the embodiment, since after a registered position close to the end point is reached and when the user makes a fine adjustment in such a way that the current position changes to a position closer to the end point, the actual lens position changes immediately after the user operates the zoom button 123 as described above, whereby the user does not feel something is wrong.

In the projector 100 according to the embodiment described above, in the lens position return process in which the lens is moved from the current position to a registered position when the registered position is within a predetermined distance from an end point of the displaceable range of the transmission unit 134, the motor 132 is so driven that the displacement direction of the transmission unit 134 is the direction from the start position toward the end point. Therefore, after the lens is moved from the current position to the registered position, the backlash does not need to be eliminated when the user makes a fine adjustment to move the lens to a position closer the endpoint. As a result, the zoom lens can be moved immediately after the user operates the zoom button 123, whereby the user does not feel something is wrong.

Further, in the lens position registration process, since the motor 132 is driven by using a small torque when the position to be registered (position of transmission unit 134 before lens position registration process is carried out) is within a predetermined distance from an end point and the final displacement direction is the direction away from the end point, the registered final displacement direction can be set to be the direction toward the end point (the direction from the center of the displaceable range toward the end point) with the backlash eliminated. As a result, when the lens position return process is carried out, the direction from the start position toward the registered position (target position) can be more likely to coincide with the registered direction.

Further, since the torque used in the small-torque driving (step S220) is a torque large enough to displace the transmission unit 134 but too small to move the lens group 157, the backlash can be eliminated without any change in the actual lens position. Further, in step S220, since the small-torque driving period is longer than or equal to a period that allows the maximum amount of backlash present in the transmission unit 134 to be eliminated, the maximum amount of backlash can be eliminated by using the small-torque driving.

B. Variations

B1. Variation 1:

In the embodiment described above, in the lens position registration process, the direction registered in step S210 when the position to be registered does not fall within a predetermined distance from an end point is the final displacement direction, but the invention is not necessarily configured this way. For example, the first direction can be registered when the position to be registered is shifted to the right of the central position (closer to maximum) of the displaceable range, or the second direction can be registered when the position to be registered is shifted to the left of the central position (closer to minimum) of the displaceable range. In this case as well, even when the direction identified in step S305 in the lens position return process differs from the registered direction, steps S325 to S340 are executed so that the lens can be moved from the current position to the target position. Still alternatively, for example, an arbitrary position within the displaceable range can be set as a reference position, and the first direction can be registered when the position to be registered is shifted to the right of the reference position (closer to maximum of displaceable range), or the second direction can be registered when the position to be registered is shifted to the left of the reference position (closer to minimum of displaceable range). Still alternatively, one of the first and second directions can be registered irrespective of where the position to be registered is located.

B2. Variation 2:

In the embodiment described above, the lens to be moved is the zoom lens. Alternatively, a focus lens, a projection lens (shift lens), or any other arbitrary lens whose position needs to be changed can be the lens to be moved instead of the zoom lens.

B3. Variation 3:

The above embodiment has been described with reference to the case where the lens position adjustment apparatus is used in a projector. Instead of being used in a projector, the lens position adjustment apparatus according to the embodiment of the invention can be used in an arbitrary apparatus including a lens whose position needs to be changed. Examples of such an apparatus include a scanner, a multifunctional apparatus including a scanner, a digital still camera, and a digital video camcorder.

B4. Variation 4:

In the embodiment described above, the predetermined distance in step S205 in the lens position registration process is twice as long as the maximum amount of backlash (20). The value can be replaced with an arbitrary value greater than or equal to the maximum amount of backlash (10) ("10", for example).

B5. Variation 5:

The configuration of the projector 100 in the embodiment described above is presented only by way of example, and a variety of variations are conceivable. For example, the transmissive liquid crystal panel 154 can be replaced, for example, with a reflective liquid crystal panel (LCOS®: liquid crystal on silicon) or a digital micro-mirror device (DMD®). Further, for example, an interface for connecting the projector to a computer (USB (universal serial bus) interface, for example) can be provided, and the lens position return menu screen W1 shown in FIG. 9 can be displayed on a display connected to the computer. Moreover, part of the configuration achieved by software may be replaced with hardware. Conversely, part of the configuration achieved by hardware may be replaced with software.

The invention is not limited to the embodiment and variations described above but can be implemented in a variety of configurations to the extent that they do not depart from the substance of the invention. For example, the technical features in the embodiment and the variations corresponding to the technical features in the aspects described in the section of Summary can be exchanged and combined with each other as appropriate in order to solve part or all of the problems described above or achieve part or all of the advantageous effects described above. Further, if the technical features are not described herein as essential, they can be omitted as appropriate.

What is claimed is:

1. A lens position adjustment apparatus that adjusts the position of a lens, the apparatus comprising:
   a transmission unit that is displaced in a first direction oriented from one endpoint of a displaceable range of the transmission unit toward the other end point thereof or a second direction oriented from the other endpoint toward the one end point to transmit power outputted from a drive source;
   a conversion unit that is connected to the transmission unit and moves the lens by using the power supplied from the transmission unit;
   a drive control unit that controls the drive source;
   a position detection unit that detects a current position of the transmission unit; and
   a storage unit that stores a registered position that is a pre-registered position in the displaceable range and a registered direction that is a pre-registered displacement direction of the transmission unit with the registered position and the registered direction related to each other, wherein when a return control process in which the drive source is so driven that the lens is moved from the current position to the registered position is carried out, the drive control unit controls the drive source in such a way that a final displacement direction in which the lens is moved from the current position to the registered position is the second direction irrespective of the registered direction in case that the registered position is within a predetermined amount of displacement from the one end point, and the drive source in such a way that the final displacement direction in which the lens is moved from the current position to the registered position is the registered direction in case that the registered position does not fall within the predetermined amount of displacement from the one end point.

2. The lens position adjustment apparatus according to claim 1, wherein the predetermined amount of displacement is greater than or equal to an amount corresponding to a maximum amount of backlash present in the transmission unit.

3. The lens position adjustment apparatus according to claim 1, further comprising a registration controller that identifies the registered position and the displacement direction and stores the identified registered position and displacement direction in the storage unit, wherein the drive control unit performs registration control in which the drive source is so controlled that the registration controller identifies the registered position and the displacement direction, and supplies the transmission unit at least for a predetermined period with small-torque power, the power being a predetermined torque and shifting the lens from the current position in the second direction, when the registration control is performed on condition not only that the registered position is within the predetermined amount of displacement distance from the one end but also that when the registration controller identifies the registered position, the lens is moved from the current position in the first direction and reaches the registered position, and the registration controller stores the current position obtained as a result of the action of supplying the transmission unit with the small-torque power at least for the predetermined period performed by the drive control unit in the storage unit as the registered position, and stores the displacement direction obtained as a result of the action of supplying the transmission unit with the small-torque power at least for the predetermined period performed by the drive control unit in the storage unit as the registered direction.

4. The lens position adjustment apparatus according to claim 3, wherein the predetermined torque is large enough to displace the transmission unit but too small to move the lens.

5. The lens position adjustment apparatus according to claim 3, wherein the predetermined period is longer than or equal to a period necessary for power smaller than or equal to the predetermined torque to displace the transmission unit by an amount corresponding to the maximum amount of backlash present in the transmission unit.

6. A projector comprising the lens position adjustment apparatus according to claim 1.

7. A projector comprising the lens position adjustment apparatus according to claim 2.

8. A projector comprising the lens position adjustment apparatus according to claim 3.

9. A projector comprising the lens position adjustment apparatus according to claim 4.

10. A projector comprising the lens position adjustment apparatus according to claim 5.

11. A lens position adjustment method for adjusting the position of a lens, the method comprising:

(a) providing a lens position adjustment apparatus including a transmission unit that is displaced in a first direction oriented from one end point of a displaceable range of the transmission unit toward the other end point thereof or a second direction oriented from the other end point toward the one end point to transmit power outputted from a drive source, a conversion unit that is connected to the transmission unit and moves the lens by using the power supplied from the transmission unit, a position detection unit that detects a current position of the transmission unit, and a storage unit that stores a registered position that is a pre-registered position in the displaceable range and a registered direction that is a pre-registered displacement direction of the transmission unit with the registered position and the registered direction related to each other, and (b) controlling the drive source, when a return control process in which the drive source is so driven that the lens is moved from the current position to a predetermined registered position in the displaceable range is carried out, the drive control unit controls, in such a way that a final displacement direction in which the lens is moved from the current position to the registered position is the second direction irrespective of the registered direction in case that the registered position is within a predetermined amount of displacement from the one end point, and the final displacement direction in which the lens is moved from the current position to the registered position is the registered direction in case that the registered position does not fall within the predetermined amount of displacement from the one end point.

12. A lens position registration method for registering the position of a lens, the method comprising:

(a) providing a lens position adjustment apparatus including a transmission unit that is displaced in a first direction oriented from one end point of a displaceable range of the transmission unit toward the other end point thereof or a second direction oriented from the other end point toward the one end point to transmit power outputted from a drive source, a conversion unit that is connected to the transmission unit and moves the lens by using the power supplied from the transmission unit, a position detection unit that detects a current position of the transmission unit, and a storage unit that stores a registered position that is a pre-registered position in the displaceable range and a registered direction that is a pre-registered displacement direction of the transmission unit with the registered position and the registered direction related to each other, (b) identifying the registered position and the displacement direction and storing the identified registered position and displacement direction in the storage unit, (c) supplying the transmission unit at least for a predetermined period with small-torque power, the power being a predetermined torque and shifting the lens from the current position in the second direction, in case that the registered position is within the predetermined amount of displacement distance from the one end and that when the registered position is identified, the lens is moved from the current position in the first direction and reaches the registered position, and (d) storing the current position obtained as a result of the action of supplying the transmission unit with the small-torque power at least for the predetermined period by controlling the drive source in the storage unit as the registered position, and storing the displacement direction obtained as a result of the action of supplying the transmission unit with the small-torque power at least for the predetermined period by controlling the drive source in the storage unit as the registered direction.

* * * * *